Nov. 11, 1969     L. MOLYNEUX     3,478,348
ANALOGUE TO DIGITAL CONVERTER
Filed May 2, 1966
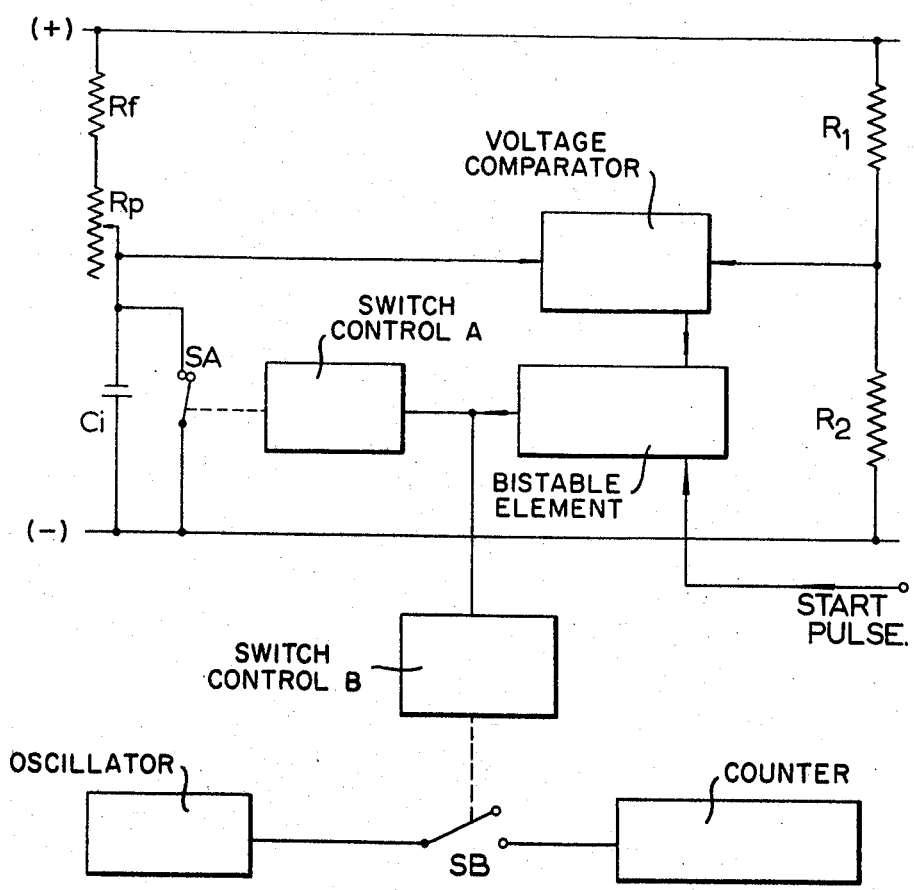

000# United States Patent Office 3,478,348
Patented Nov. 11, 1969

3,478,348
ANALOGUE TO DIGITAL CONVERTER
Lindsay Molyneux, 4 Leazes Crescent,
Newcastle-upon-Tyne 1, England
Filed May 2, 1966, Ser. No. 546,888
Int. Cl. H03k *13/02*
U.S. Cl. 340—347        7 Claims

ABSTRACT OF THE DISCLOSURE

The resistance value to digital converter disclosed consists of a resistor, which is variable in accordance with some function to be digitized, in series with a capacitor. There is also a tapped preset potentiometer, and a voltage comparator between the potentiometer and the junction of the capacitor and the variable resistor. When switched on, a counter starts counting at a fixed rate and is stopped by the comparator when the capacitor voltage equals that of the center tap of the potentiometer. The counter reading is a direct measurement of the value of the variable resistor to a linear scale.

---

This invention is for improvements in or relating to apparatus for converting analogue information into digital form.

Though the system can be used for analogue inputs other than mechanical it is for the digitalization of mechanical inputs that the system is particularly intended. A typical example of the use of the system would be where a digital representation, consisting of visual figures, punched tape, or printed figures is required of the position of a marker pen which might be, for example, the output of a recording spectrophotometer. The problem is to sense the position of the pen and turn this into figures.

There are several conventional methods of doing this. For example an encoder switch might be used. Alternatively a resistive potentiometer could be arranged so that its angular position is related to the pen position; if the potentiometer is connected across a constant potential source the potential between the moving element of the potentiometer and one end of the potentiometric element is directly related to the position of the pen. This potential can then be measured with a digital voltmeter and the output of this device used to punch tape, print figures or display figures as required.

The present invention provides means which allows the digital voltmeter part of the apparatus to be markedly simplified. In a embodiment thereof the potentiometer is used not as a potential divider but as a variable resistance and the new "digital voltmeter" parts of the apparatus is merely a digital resistance meter; the apparatus gives identical results to the conventional approach of the potentiometer digital voltmeter combination.

The digital measurement of resistance is made as follows. The theory of the charging of a capacitor through a resistor from a constant voltage supply states that the voltage $v$ across the capacitor $c$ is given by the expression $$v = V\left(1 - e^{\frac{-t}{CR}}\right)$$

where V is the supply voltage, which is to say that the rise of voltage is an exponential function of time, and the time taken to reach any given fraction of the supply voltage is directly proportional to the product CR.

Suppose the function of the supply voltage to which the capacitor is to charge is fixed at one-half then the time taken for the capacitor to reach ½ v. supply is given by $t = (\log_e 2)CR$ or $t = 0.707CR$, hence if $t$ can be measured R can be calculated—or to put it another way the resistance of the potentiometer is represented by a time interval.

Reference should now be made to the accompanying drawing, which shows a schematic view of the system.

The action of the measuring circuits can best be understood by referring to the drawings. In between measurements of resistance the electronic bistable element BS has no output and the switch control circuits Sc.A and Sc.B are arranged to keep the switch SA closed and switch SB open.

When a measurement of resistance is required a start pulse is fed to the bistable element BS causing an output to appear which opens SA and closes SB. Thus the capacitor Ci begins to charge (through Rf and Rp) towards the supply potential and pulses from a fixed frequency oscillator O pass through SB and are counted by a counter C. When the potential of C is equal to the potential at the junction of $R_1$ and $R_2$ (½ v. supply since $R_1 = R_2$) then the two inputs of the voltage comparator Cpr are equal and the comparator produces an output pulse. This pulse changes the bistable element BS back to its original state, thus closing SA (via Sc.A), discharging C, opening SB (via Sc.B) and preventing further pulses reaching the counter. Since the counter was originally at zero (a separate circuit ensures this) the number of pulses received by the counter indicates the length of time that SB remained closed, which is the same as that required for Ci to charge to one-half the supply voltage. The number in the counter therefore bears a direct relationship to the total value of Rp+Rf and varies as Rp varies, since Rf is fixed. Resistance Rf is necessary since without it the charging resistor Rp could approach zero value, implying an infinitely small charging time. Rf is therefore normally made 10% of Rp max., and the counter can be made to register a number directly proportional to R by setting it not to zero before a reading, but to −10% of full count value.

There are many ways in which the functions described above may be realized. In particular, the circuit may be made using transistors as the active circuit elements. Again, solid state integrated circuits in which many transistors and resistors are contained within a single package may now be obtained which allow the circuit to be built with but few packages. For example the voltage comparator function may be obtained in a single encapsulated unit and the bistable unit can also be obtained as a single unit.

A film circuit where the resistive elements are made together on a common surface and the active circuit elements later attached may also be used.

The essential feature of the system is therefore a method of measuring the time taken for a capacitor to be charged to a fixed proportion of the input voltage in a resistance-capacitance circuit. The time is measured by counting the number of cycles of a fixed frequency oscillator that occur during this time period.

The variable resistor is made to vary linearly with the input mechanical variable. The counter could be of the multicathode neon type but more probably would be made from transistor binary stages.

As well as its main use of mechanical analogue to digital conversion, the system can be used as a digital resistance measuring device. There are also other devices which change their resistance linearly with some input variable. For instance, some photocells (e.g., cadmium sulphide) change their resistance linearly with illumination and hence the system could be used as a digital illumination meter.

I claim:

1. An apparatus for linearly converting analogue to digital information comprising a variable resistor, means for adjusting the value of said resistor to a value corresponding to the magnitude of a variable quantity to be digitized, a capacitor in series with said resistor, a voltage supply connected to the resistor-capacitor combination and to a tapped preset potentiometer, a voltage comparator connected from the junction of said resistor and said capacitor to said tapping of said potentiometer, a fixed frequency pulse source and a pulse counter together with a switching means adapted on recept of a start signal to simultaneously remove a short-circuit from said capacitor and connect said pulse source to said counter, and on receipt of a stop signal from said comparator to reverse the action of said switching means to stop said counter.

2. An apparatus as recited in claim 1 characterized in that said variable resistor is variable between a minimum finite value and full value.

3. An apparatus as recited in claim 1 characterized in that said switching means comprises a bistable element, a start lead carrying a "set" impulse and a stop lead from said comparator carrying a "reset" impulse.

4. An apparatus as recited in claim 1 characterized in that said potentiometer is center-tapped, said switching means being actuated to stop said counter when the potential of said capacitor becomes equal to that of the center-tap of said potentiometer.

5. An apparatus as recited in claim 1 characterized in that at least a portion of the circuit thereof is constructed in solid-state integrated form.

6. An apparatus as recited in claim 1 characterized in that at least a portion of the circuit thereof is constructed from thin-film components.

7. A process for converting analogue to digital information comprising the steps of:
(a) adjusting a resistor to a value corresponding to the magnitude of the quantity to be converted into digits;
(b) connecting said resistor in series with a capacitor to a source of electrical potential to charge said capacitor;
(c) simultaneously connecting a source of impulses of a predetermined frequency to a counter;
(d) comparing the rising potential of said capacitor with a potential less than that of said source and derived therefrom;
(e) disconnecting said impulse source from said counter when said capacitor potential becomes equal to said derived potential.

References Cited

UNITED STATES PATENTS

| | | | |
|---|---|---|---|
| 3,287,723 | 11/1966 | Metcalf | 340—347 |
| 3,281,828 | 10/1966 | Kaneko | 340—347 |
| 2,994,825 | 8/1961 | Anderson | 324—111 |
| 2,920,274 | 1/1960 | Gustafsson | 324—111 |

MAYNARD R. WILBUR, Primary Examiner

JEREMIAH GLASSMAN, Assistant Examiner

U.S. Cl. X.R.

235—92; 324—68, 111